US007512458B2

(12) United States Patent
Mateer

(10) Patent No.: US 7,512,458 B2
(45) Date of Patent: Mar. 31, 2009

(54) SYSTEM AND METHOD FOR REMOTE BAGGAGE CHECK-IN

(76) Inventor: Craig C. Mateer, 4932 Oak Island Rd., Orlando, FL (US) 32809

( * ) Notice: Subject to any disclaimer, the term of this patent is extended or adjusted under 35 U.S.C. 154(b) by 0 days.

(21) Appl. No.: 11/945,688

(22) Filed: Nov. 27, 2007

(65) Prior Publication Data

US 2008/0071419 A1 Mar. 20, 2008

Related U.S. Application Data

(63) Continuation of application No. 10/689,873, filed on Oct. 21, 2003, now Pat. No. 7,310,568.

(60) Provisional application No. 60/420,042, filed on Oct. 21, 2002.

(51) Int. Cl.
*G06F 7/00* (2006.01)
*G06Q 10/00* (2006.01)

(52) U.S. Cl. .............................. 700/213; 705/5; 705/28

(58) Field of Classification Search ................. 700/213; 705/5, 28
See application file for complete search history.

(56) References Cited

U.S. PATENT DOCUMENTS

| | | | | | |
|---|---|---|---|---|---|
| 4,711,994 | A | * | 12/1987 | Greenberg | ................... 235/384 |
| 4,984,156 | A | * | 1/1991 | Mekata | .......................... 705/5 |
| 5,401,944 | A | * | 3/1995 | Bravman et al. | ............. 235/375 |
| 5,793,639 | A | * | 8/1998 | Yamazaki | .................... 700/226 |
| 6,044,353 | A | * | 3/2000 | Pugliese, III | .................... 705/5 |
| 6,512,964 | B1 | * | 1/2003 | Quackenbush et al. | ....... 700/226 |
| 6,594,547 | B2 | * | 7/2003 | Manabe et al. | .............. 700/227 |
| 6,662,078 | B1 | * | 12/2003 | Hardgrave et al. | ........... 700/226 |
| 6,711,463 | B2 | * | 3/2004 | Tozuka et al. | ................ 700/225 |

* cited by examiner

*Primary Examiner*—Gene O. Crawford
*Assistant Examiner*—Ramya G Prakasam
(74) *Attorney, Agent, or Firm*—Foley & Lardner LLP

(57) ABSTRACT

A computer-based baggage transportation system includes a client computer and an attendant. The client computer is coupled via a network to a server computer and is configured to check in baggage and passengers from a property that is remote from a common carrier departure location. The attendant is cross-utilized with the remote property. That is, the attendant performs remote common carrier check-in services as well as remote property services. The attendant has met federal agency approval standards for common carrier check-in services.

18 Claims, 5 Drawing Sheets

SYSTEM AND METHOD FOR REMOTE BAGGAGE CHECK-IN

CROSS REFERENCE TO RELATED APPLICATIONS

The present application is a continuation application of U.S. application Ser. No. 10/689,873 entitled "System And Method for Remote Passenger and Baggage Check-In." It also claims priority to U.S. Provisional Application 60/420,042 entitled "Remote Passenger and Baggage Check-In Method and System" filed on Oct. 21, 2002, and incorporated herein in its entirety by reference.

FIELD OF THE INVENTION

The present invention relates generally to common carrier baggage processing. More particularly, the present invention relates to a system and method for remote baggage check-in.

BACKGROUND OF THE INVENTION

Checking in baggage and obtaining a boarding pass for travel via common carriers (e.g., commercial air or cruise line) can be inconvenient and time-consuming. The time required for checking baggage and obtaining a boarding pass has been made even more cumbersome after added security measures adopted following the terrorist airplane hijackings of Sep. 11, 2001. A need exists to provide the traveling public with improved services that permit convenient and secure interim baggage storage, remote passenger and baggage check-in, and timely transfer of baggage from a remote property to a common carrier point of departure.

Services are known in the art for advance pickup of passenger baggage from a remote property and direct delivery to an airport for check-in. However, such prior services typically require long lead times, such as for example, up to 12 to 24 hours, before airline departure time, permitting baggage screening during off-peak periods. In addition, boarding passes are not issued in advance.

Prior attempts have been made to improve remote baggage processing. For example, Certified Airline Passenger Services (CAPS) of Las Vegas, Nev., attempted to provide remote passenger and baggage processing from 1998 until 2001. CAPS used hotels as a point of remote baggage check-in, providing a third party check-in counter in hotel lobbies. The CAPS service was not integrated into hotel operations. Instead, these check-in counters and related staff members were made available to hotel guests as a clearly separate service being offered by a third party other than the hotel. Hotel guests could check their baggage and pick up boarding passes at a hotel lobby station, thus avoiding both activities at the airport.

The CAPS approach suffered from several limitations and eventually the company was unable economically to continue its service. For example, the CAPS approach used CAPS employees whose sole function was baggage and passenger processing. Such staffing proved costly. Employees were occupied for only limited times (when customers were checking bags) but needed to be available for long periods of time (whenever customers might request the service) and the service would only be used by passengers if the fee charged were minimal (e.g., $6.00 per passenger). Some economies of scale could be achieved at mega-hotels (e.g., 4000+ rooms), but the number of such hotels are limited and larger hotels require more employees to support times when many guests want to check bags at the same time.

Another example of an attempt to improve common carrier baggage processing systems is described in U.S. Pat. No. 6,512,964 entitled Baggage Transportation System and listing Quackenbush, et al. as inventors. The Quackenbush patent describes using the Internet to capture travel information from a user including an origin location and a destination location. The baggage is collected from the origin location, taken to an origin airport where it placed on a correct flight, and delivered from a destination airport to the destination location.

The Quackenbush patent fails to provide important teachings that may ultimately determine the viability of the service when implemented, if ever. The Quackenbush patent indicates that a Ground Delivery Operator (GDO) picks up baggage from an origin location and takes it to an origin airport. However, there is no teaching of how customers check in baggage. It is not clear if the passenger has to wait for a GDO to travel to where the customer is or, if a GDO is located at the remote property, how staffing issues are addressed. Indeed, there is nothing in the Quackenbush patent that helps solve the staffing problems faced by known remote baggage processing systems, such as the CAPS service.

Thus, there is a need for an improved common carrier passenger and baggage processing system. Further, there is a need for a remote common carrier passenger and baggage processing system that cross-utilizes employees at the remote property. Even further, there is a need for baggage and passenger check-in kiosks for such remotely located common carrier passenger and baggage processing systems.

SUMMARY OF THE INVENTION

The present invention is directed to a system and method for delivering integrated services for remote passenger baggage handling and check-in. In an exemplary embodiment, these services are implemented by fully integrating with existing operations and staff at remote properties. In this way, remote baggage check-in and boarding pass issuance may be handled in the course of guest departures at the remote property. The integration with existing operations can be accomplished through the use of an outsourcing arrangement between a remote baggage check-in service provider and the remote properties.

For a fee, the service provider supplies and manages trained and FAA approved staff for bellhop, valet, and parking garage positions (collectively, "attendants") at the remote property. In addition to their customary roles, the attendants handle remote baggage check-in, baggage temporary storage, boarding pass issuance, and secure transportation of baggage from the remote property to common carriers' points of departure. The system and method provide passengers with a seamless and transparent interface to remote baggage check-in services. Economic and operational advantages derive from using the same integrated staff for remote property and remote baggage check-in services. High labor costs inherent in the use of separate and dedicated staff to provide similar services are avoided.

Since the same attendant performs the traditional bellhop, valet, or parking garage duties, as well as the remote baggage check-in services, the cost burden of the remote baggage handling inactivity is substantially subsidized. Thus, greater work capacity is provided during peak periods of guest departures at the remote properties. At the same time, the incremental operating cost for such services over the conventional operating costs for bellhop, valet and parking garage attendants is quite small.

Briefly, one exemplary embodiment relates to a method for remotely arranging the transportation of baggage for passengers of a common carrier. The method includes receiving travel information for a passenger via a communications network, identifying passenger baggage to be transported, and cross-utilizing employees of a remote property to obtain possession of the identified passenger baggage and manage transportation of the passenger baggage from the remote property to a common carrier origin identified in the received travel information.

Another exemplary embodiment relates to a computer-based baggage transportation system. The system includes a server computer, a client computer, and an attendant. The server computer includes travel information for a plurality of common carriers. The client computer is coupled via a network to the server computer and is configured to check in baggage and passengers from a property that is remote from a common carrier departure location. The attendant is cross-utilized with the remote property. That is, the attendant performs remote common carrier check-in services as well as remote property services. The attendant has met federal agency approval standards for common carrier check-in services.

Yet another exemplary embodiment relates to a method in a remote baggage and passenger check-in system. The method includes obtaining passenger identification information for a passenger, using the passenger identification information to retrieve travel information for the passenger from a server computer, printing a boarding pass for the passenger based on the retrieved travel information, printing a baggage identification label for passenger baggage at a property remote from a common carrier departure location, transferring possession of the passenger baggage from the passenger to an attendant at the remote property, securely transporting the passenger baggage from the remote property to the common carrier departure location, and transferring possession of the passenger baggage to the common carrier. The attendant at the remote property has remote property responsibilities and baggage management responsibilities and the attendant is qualified to obtain possession of the passenger baggage.

Other principle features and advantages of the invention will become apparent to those skilled in the art upon review of the following drawings, the detailed description, and the appended claims.

BRIEF DESCRIPTION OF THE DRAWINGS

Exemplary embodiments will hereafter be described with reference to the accompanying drawings.

DETAILED DESCRIPTION OF EXEMPLARY EMBODIMENTS

Figure 1:
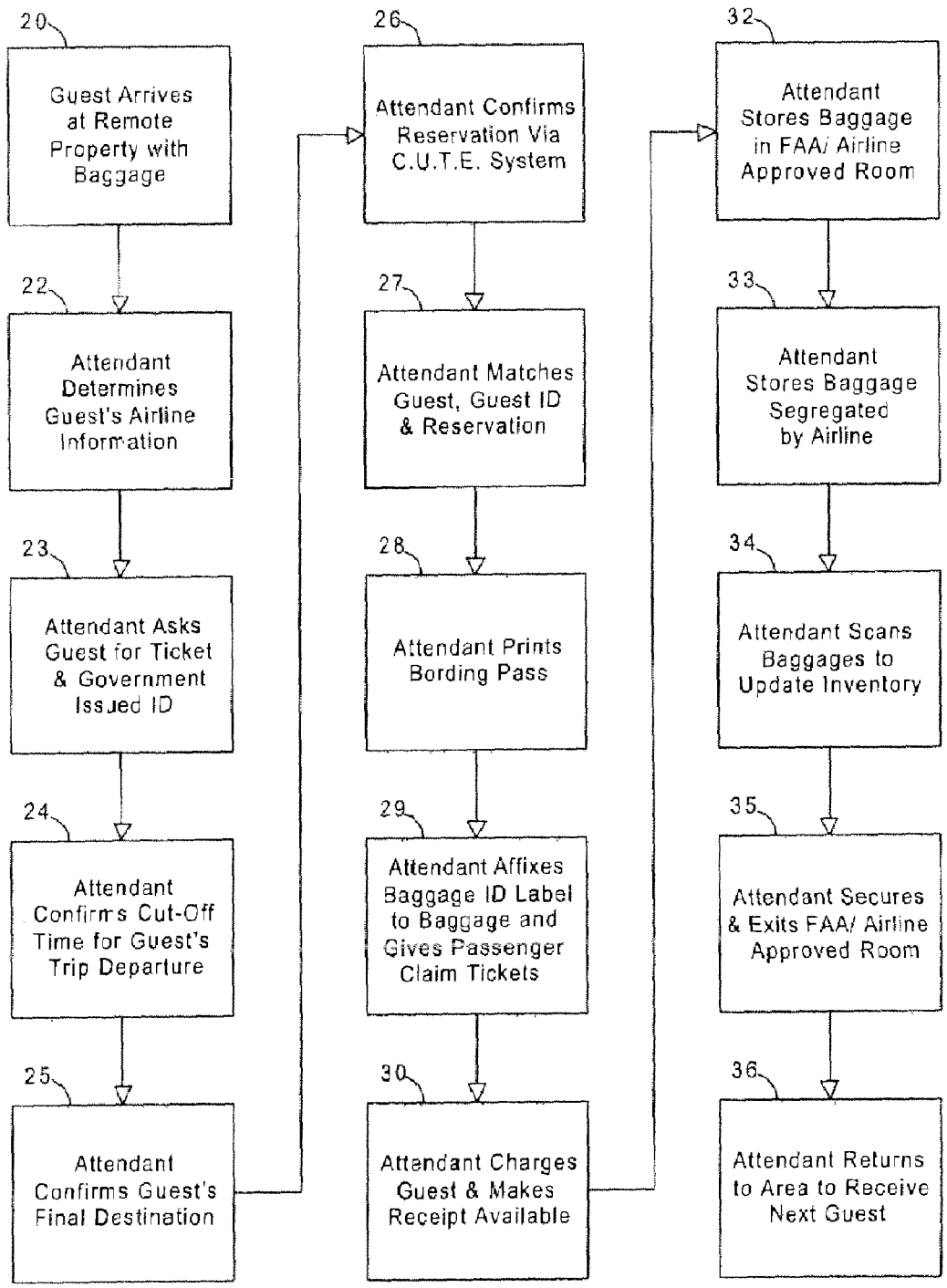
FIG. 1 is a flow diagram depicting operations in a remote baggage and passenger processing system in accordance with an exemplary embodiment.

FIG. 1 illustrates operations performed in an exemplary embodiment of a remote baggage and passenger processing system. Additional, fewer, or different operations can be performed in alternative embodiments. A remote intake process takes place at a remote property 81 (FIG. 3), such as a hotel, office, resort, or convention center. A guest 84 arrives (block 20) at the remote property 81. An attendant 83 determines an airline 82 with which the guest has a reservation (block 22). The attendant 82 asks the guest 84 for her ticket, as well as at least one form of government-issued identification, such as a driver's license or U.S. passport (block 23).

The attendant 83 may accept remote baggage check-in any time prior to the pre-departure cutoff time, which may vary according to the traffic conditions, locations of remote properties and common carrier 82 points of departure and weather conditions. The cut-off time is selected to ensure timely delivery of baggage to the airlines with sufficient time before flight time to process and load the baggage onto the plane. Such cut-off times can be two to four hours before a common carrier departure time. Thus, the attendant 82 must confirm the guest flight departure time and final destination (blocks 24, 25).

Using industry-standard common use terminal equipment (CUTE), the attendant 83 confirms the guest's 84 reservation (block 26). The attendant 83 matches the guest, her identification and reservation-information (block 27). If the attendant 83 determines there is a match, the attendant prints a boarding pass (block 28), affixes one or more baggage claim tickets to the ticket folder, and inserts the boarding pass into the ticket folder, returning the completed ticket folder to the guest (block 29). The attendant 83 attaches identification tags or labels to the baggage. The attendant 83 charges the guest 84 for the remote baggage check-in service according to a standardized pricing schedule, making the receipt available to the guest 84.

The attendant 83 stores the guest's baggage 85 in an FAA and airline approved storage room at the remote property 81, which is secured against unauthorized entry (block 32). The attendant 83 places the baggage 85 in an airline-specific location within the room (block 33). As part of the storing operation, the attendant 83 scans the baggage 85, which has been tagged using a bar code or other similar means for uniquely identifying each piece of baggage. The attendant 83 scans the tag to digitally record a unique identifying code for each piece of baggage 85 (block 34). Finally, the attendant 83 secures and exits the storage room, and returns to his station in the remote property 81 to receive the next guest 84.

Figure 2:
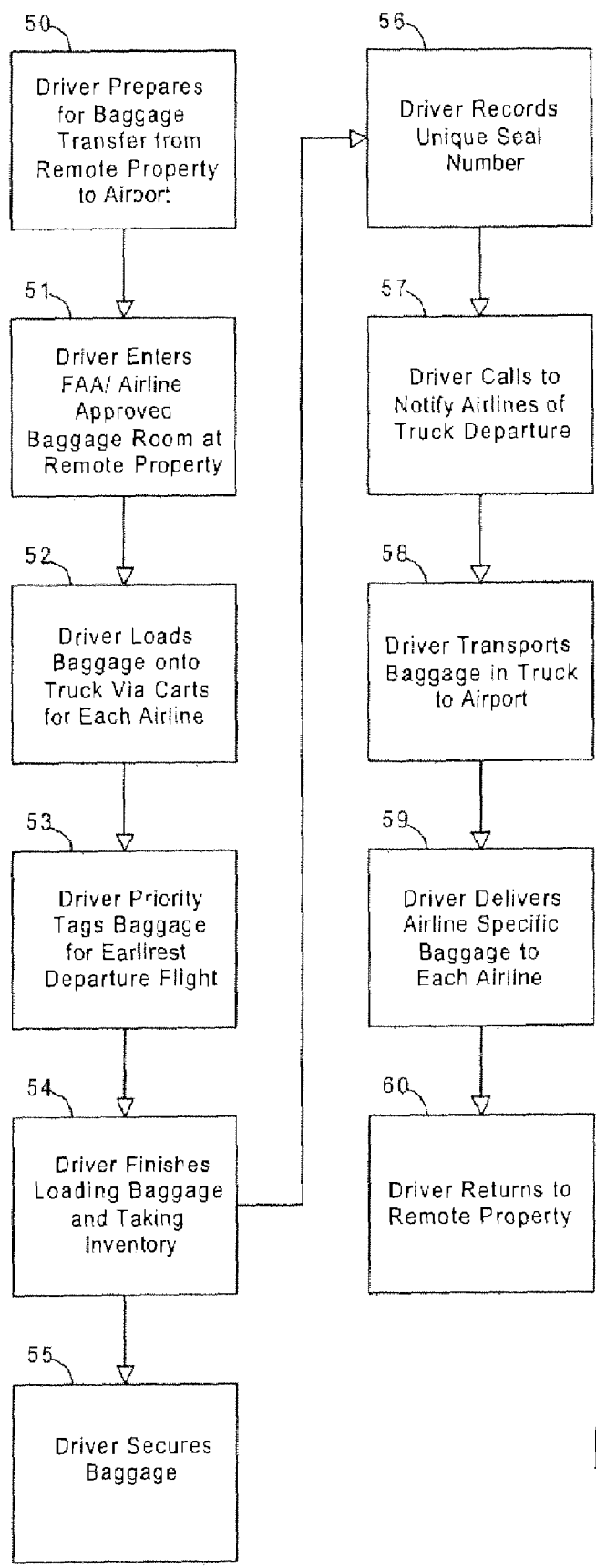
FIG. 2 is a flow diagram depicting operations in a secured baggage transport system in accordance with an exemplary embodiment.

FIG. 2 is a flow chart of a secured baggage transport process of an exemplary embodiment. Additional, fewer, or different operations can be performed in alternative embodiments. One or more attendants 63 from each remote property 81 may be designated as a driver, who periodically transports baggage to the common carrier via securable truck 86. At a scheduled interval, the driver prepares for baggage transfer and enters the storage room at the remote property 51 (blocks 50, 51). The driver loads baggage onto the truck via wheeled carts designated for each common carrier 82, tagging baggage 85 bound for the earliest departure time for that transfer run (blocks 52, 53). The driver completes the baggage loading while performing a scanner inventory of each piece of baggage 85 (block 54). The driver locks the truck storage compartment using a tamper-proof seal, coded with a unique identifying number (block 55). Alternatively, the carts can be securely sealed with the tamper-proof seal instead of the truck, or both the carts and the truck can be sealed. The driver records the unique identifying number of the tamper-proof seal (on the truck or on the carts) and calls to notify the airlines of the truck departure and other pertinent information (block 56, 57). The driver transports the sealed truck containing the baggage to the airport (block 58) and delivers the baggage 85 to each airline 82. Finally, the driver returns to the remote property to begin the cycle again (block 60).

Figure 3:
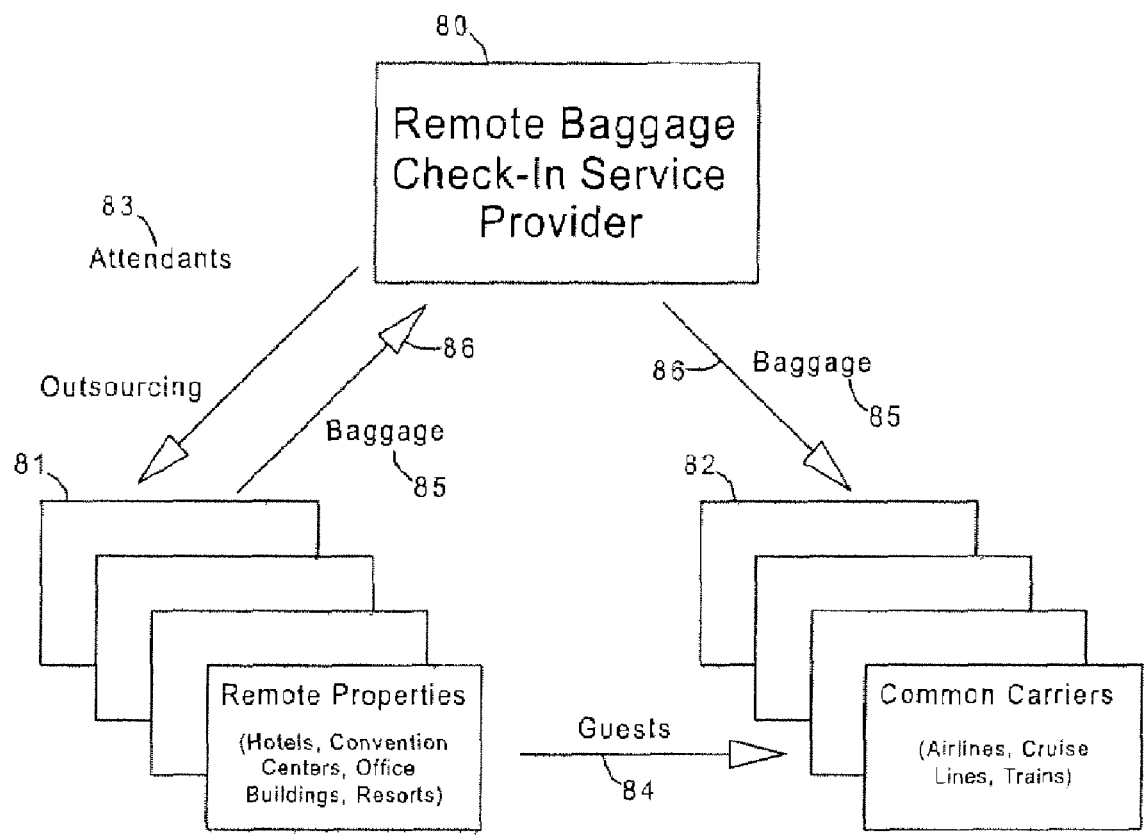
FIG. 3 is a diagrammatic representation of the inter-relationships between a service provider, one or more remote properties, and one or more common carrier points of departure.

FIG. 3 illustrates a diagram depicting exemplary interrelationships between the service provider 80, one or more remote properties 81, and one or more common carrier 82 points of departure. The service provider's attendants 83 are integrated into operations of a remote property. The service provider 80 can furnish attendants 83 to the remote properties through an outsourcing arrangement. For example, in the case of a hotel remote property, these attendants, as employees or agents of the service provider, work as members of the hotel staff, in the capacity of bellhop, valet, security, or parking garage attendant. In these roles, attendants 83 can immediately provide guests 84 with remote baggage check-in services without the need to redirect the guest to a specialized and separate location at the remote property 81.

At pre-determined time intervals, an attendant (driver) at each remote property 81 retrieves baggage 85 from the secured storage room at the remote property 81, loads and transfers the baggage 85 via securable truck 86 to the common carrier 82, and delivers individual pieces of baggage 85 to the appropriate airline or other common carrier 82.

Figure 4:
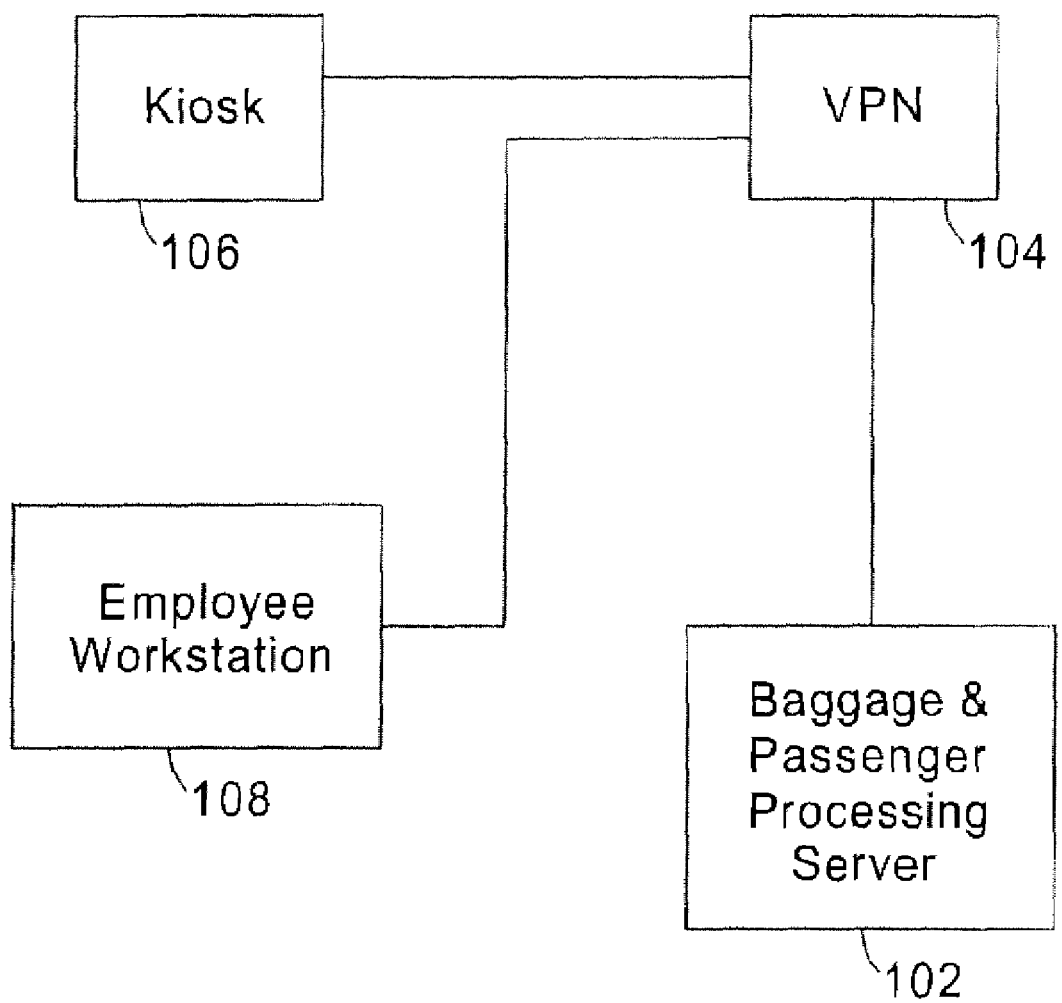
FIG. 4 is a diagrammatic representation of a remote baggage and passenger processing system in accordance with an exemplary embodiment.

FIG. 4 illustrates a diagram depicting a remote baggage and passenger processing system 100 having a baggage and passenger processing server 102 coupled to a network 104. The network 104 can be a virtual private network (VPN) providing communication access between the server 102 and a kiosk 106 and/or an employee workstation 108. The kiosk 106 is a small structure having a display and an electronic processor located nearby or within the remote property where a passenger can provide identification, such as a credit card, and interact with the server 102 to check-in, receive a boarding pass, and check any baggage the passenger may have. The kiosk 106 has a printing device that prints a boarding pass for the passenger as well as baggage claim tickets. An attendant finalizes the baggage check-in process by obtaining an identification label for the baggage, attaching it, and taking possession of the baggage. In an exemplary embodiment, an attendant printer separate from the kiosk 106 is used for the printing of baggage identification labels or stickers.

The employee workstation 108 is a computer dedicated to processing baggage and passengers and operated by an attendant. A person of skill in the art will appreciate that the employee workstation 108 could be coupled to other networks, such as the Internet, but that concerns for security of the server 102 and the travel information available within the server 102 may justify limiting the employee workstation 108 to only a dedicated network, such as the network 104. The employee workstation 108 includes a computer and printer and performs the same check-in operations as the kiosk 106.

When a customer uses the kiosk 106 for checking in baggage, a service provider attendant or employee at the remote property can perform a verification of the identification of the individual passenger. Further, the attendant takes and labels the passenger baggage with identification tags or stickers. These tags may have bar coding on them to facilitate tracking of the baggage. The attendant takes possession of the baggage for secure storage and delivery of the baggage to the common carrier, as described above with reference to FIGS. 1-3.

Figure 5:
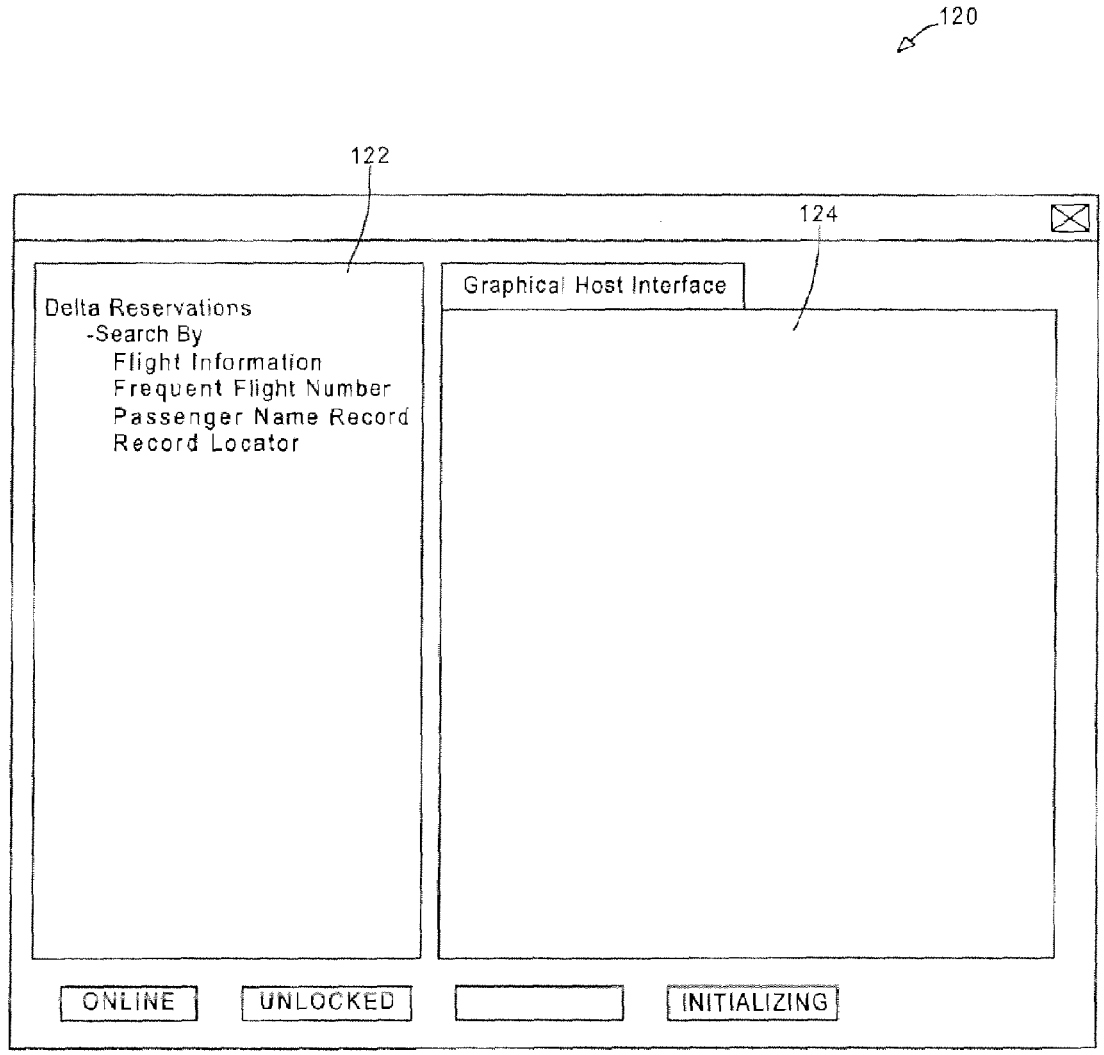
FIG. 5 is a user interface for a workstation used in the remote baggage and passenger processing system of FIG. 4.

FIG. 5 illustrates an example user interface 120 for a workstation used in the remote baggage and passenger processing system 100 described with reference to FIG. 4. The user interface 120 provides for the location of flight reservations according to flight information (e.g., flight number, departure or arrival city), frequent flyer number, passenger name record, or a record number. A selection of how to search for a flight can be made by selecting an option in portion 122 of the user interface 120.

A portion 124 of the user interface 120 provides a graphical host interface where flight information is displayed and passenger and baggage check-in information can be entered. The interface depicted in portion 124 connects a workstation at a remote property with a server containing common carrier information. Other user interfaces can be utilized, including interfaces for different devices. For example, a user interface for a kiosk may include drop down menus, text boxes, and other features to simplify interaction with the passenger.

Advantageously, the user interface 120 provides one unified graphical user interface for all airlines or common carriers. As such, attendants can service passengers for many different carriers instead of just one. The user interface 120 can also include information regarding passenger and baggage check-in requirements that trains (or reminds) attendants to specific common carrier baggage and passenger rules and requirements. For example, different airlines (or other common carriers) may have different weight restrictions for checked baggage or restrictions on the number of bags per passenger. The user interface 120 informs the attendant of such common carrier specific requirements such that applicable action can be taken, such as a surcharge for heavy baggage or additional bags beyond a per passenger limit.

The remote baggage and passenger processing system and method described with reference to FIGS. 1-5 provide an economically feasible solution to the time-consuming and cumbersome task of checking baggage at a common carrier. One advantage to the cross-utilization of employees at a remote property is the ability for the service to financially withstand shut-downs. If, for example, airlines cancel flights for a period of time, attendants continue to do remote property functions, even though the baggage and passenger processing services are unavailable.

This detailed description outlines exemplary embodiments of a remote baggage and passenger processing system and method. In the foregoing description, for purposes of explanation, numerous specific details are set forth in order to provide a thorough understanding of the present invention. It is evident, however, to one skilled in the art that the exemplary embodiments may be practiced without these specific details. In other instances, structures and devices are shown in block diagram form in order to facilitate description of the exemplary embodiments.

While the exemplary embodiments illustrated in the Figures and described above are presently preferred, it should be understood that these embodiments are offered by way of example only. Other embodiments may include, for example, a wide range of technological tools used by employees at the remote property, including wireless handheld devices, barcode printing devices, and many other different technologies. The invention is not limited to a particular embodiment, but extends to various modifications, combinations, and permutations that nevertheless fall within the scope and spirit of the appended claims.

What is claimed is:

1. A method for managing the transportation of baggage for passengers of a common carrier, the method comprising:
   providing a baggage transportation service at a remote property, the remote property being remote from a transportation center, the baggage transportation service including
      receiving travel identification including departure information for baggage of the passenger, the baggage to be transported to the transportation center; and transporting the baggage to the transportation center; and providing an outsourcing arrangement for an employee at the remote property to perform both a first service associated with the baggage transportation service and a second service associated with an operation at the remote property, the second service distinct from the first service.

2. The method of claim 1, wherein receiving identification comprises reading a bar code.

3. The method of claim 1, wherein the travel identification is a baggage tag received with a boarding pass by the passenger at a computer.

4. The method of claim 3, wherein the computer is not located at the remote location.

5. The method of claim 1, wherein the remote property is a cruise boat property.

6. The method of claim 1, wherein the travel identification is a baggage tag, and further wherein the baggage tag includes security check-in information.

7. The method of claim 1, wherein the second service is selected from the group consisting of a bellhop service, a valet service, and a parking garage service.

8. The method of claim 1, wherein the second service is selected from the group consisting of a concierge service, a check-out service, a security service, or a room service.

9. A computer-based baggage transportation system comprising:
- a client computer coupled via a network to a server computer, the client computer being configured to check in baggage from a property that is remote from a common carrier departure location; and
- a baggage pick-up facility at the remote property for performing a baggage transportation service, wherein associated with the baggage transportation service is an outsourcing arrangement for an employee at the remote property to perform both a first service associated with the baggage transportation service and a second service associated with an operation at the remote property, the second service distinct from the first.

10. The system of claim 9, wherein the property is a hotel and the second service is selected from the group consisting of a bellhop service, a valet service, and a parking garage services.

11. The system of claim 9, wherein the client computer is part of a kiosk.

12. In a remote baggage and passenger check-in system, a method comprising:
(a) obtaining passenger identification information for a passenger;
(b) obtaining possession of the passenger baggage from the passenger at a remote property to conduct a baggage transportation service, wherein associated with the baggage transportation service is an outsourcing arrangement for an employee at the remote property to perform both a first service associated with the baggage transportation service and a second service associated with an operation at the remote property, the second service distinct from the first service;
(c) securely transporting the passenger baggage from the remote property to the common carrier departure location; and
(d) transferring possession of the passenger baggage to the common carrier.

13. The method of claim 12, wherein retrieving travel information for the passenger from a server computer comprises accessing travel information using common use terminal equipment.

14. The method of claim 12, further comprising accessing a server to register a passenger and obtain a boarding pass.

15. The method of claim 12, wherein the retrieved travel information includes information on an airline flight, wherein the airline flight is schedule to depart the common carrier departure location less than twelve hours from when the passenger transfers possession of the passenger baggage as part of the baggage transportation service at the remote property.

16. The method of claim 12, further comprising presenting a user interface configured to provide access to common carrier information for a plurality of common carriers.

17. The method of claim 12, wherein the second service is selected from the group consisting of a bellhop service, a valet service, and a parking garage service.

18. The method of claim 12, wherein the second service is selected from the group consisting of a concierge service, a check-out service, a security service, or a room service.

* * * * *